US008992300B2

(12) United States Patent
Williams

(10) Patent No.: US 8,992,300 B2
(45) Date of Patent: Mar. 31, 2015

(54) ELECTRONIC GAMING DEVICE WITH MULTIPLIER BANKING

(75) Inventor: Christopher Deon Williams, Stone Mountain, GA (US)

(73) Assignee: Cadillac Jack, Inc., Duluth, GA (US)

( * ) Notice: Subject to any disclaimer, the term of this patent is extended or adjusted under 35 U.S.C. 154(b) by 0 days.

(21) Appl. No.: 13/557,010

(22) Filed: Jul. 24, 2012

(65) Prior Publication Data

US 2014/0031099 A1 Jan. 30, 2014

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.
CPC .................................... *G07F 17/32* (2013.01)
USPC ................................ 463/20; 463/16; 463/25

(58) Field of Classification Search
USPC ....................... 463/16-20, 25, 29-31, 40-42
See application file for complete search history.

(56) References Cited

U.S. PATENT DOCUMENTS

| | | | | |
|---|---|---|---|---|
| 8,408,990 | B2 * | 4/2013 | De Waal et al. | 463/20 |
| 2002/0022514 | A1 * | 2/2002 | Randall et al. | 463/20 |
| 2004/0162134 | A1 * | 8/2004 | Walker et al. | 463/20 |
| 2004/0171419 | A1 * | 9/2004 | Walker et al. | 463/20 |
| 2004/0224745 | A1 * | 11/2004 | Bregenzer | 463/16 |
| 2008/0076532 | A1 * | 3/2008 | Graham et al. | 463/25 |
| 2009/0124326 | A1 * | 5/2009 | Caputo et al. | 463/20 |
| 2009/0124327 | A1 * | 5/2009 | Caputo et al. | 463/20 |
| 2009/0124339 | A1 * | 5/2009 | Barton et al. | 463/20 |
| 2011/0045898 | A1 * | 2/2011 | Anderson | 463/25 |
| 2011/0124402 | A1 * | 5/2011 | De Waal et al. | 463/25 |
| 2012/0252552 | A1 * | 10/2012 | Barton et al. | 463/20 |
| 2012/0295689 | A1 * | 11/2012 | Owen et al. | 463/20 |

* cited by examiner

*Primary Examiner* — Milap Shah
(74) *Attorney, Agent, or Firm* — Stephen Eisenmann

(57) ABSTRACT

Examples disclosed herein relate to systems and methods, which may receive primary wagers and secondary wagers. The systems and methods may bank a portion of a multiplier for future utilization.

17 Claims, 12 Drawing Sheets

ELECTRONIC GAMING DEVICE WITH MULTIPLIER BANKING

FIELD

The subject matter disclosed herein relates to an electronic gaming device. More specifically, the disclosure relates to an electronic gaming device, which provides gaming options relating to banking one or more multipliers.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. The winning payout from a winning event may be modified (e.g., multiplied, increased, etc.) based on a modifying symbol (e.g., a multiplier) being generated during game play. A new way of delivering game play includes providing wagering gaming options, which may include multiplier banking options. In this disclosure, the gaming device and/or the gaming system may provide more excitement by utilizing multiplier banking options.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
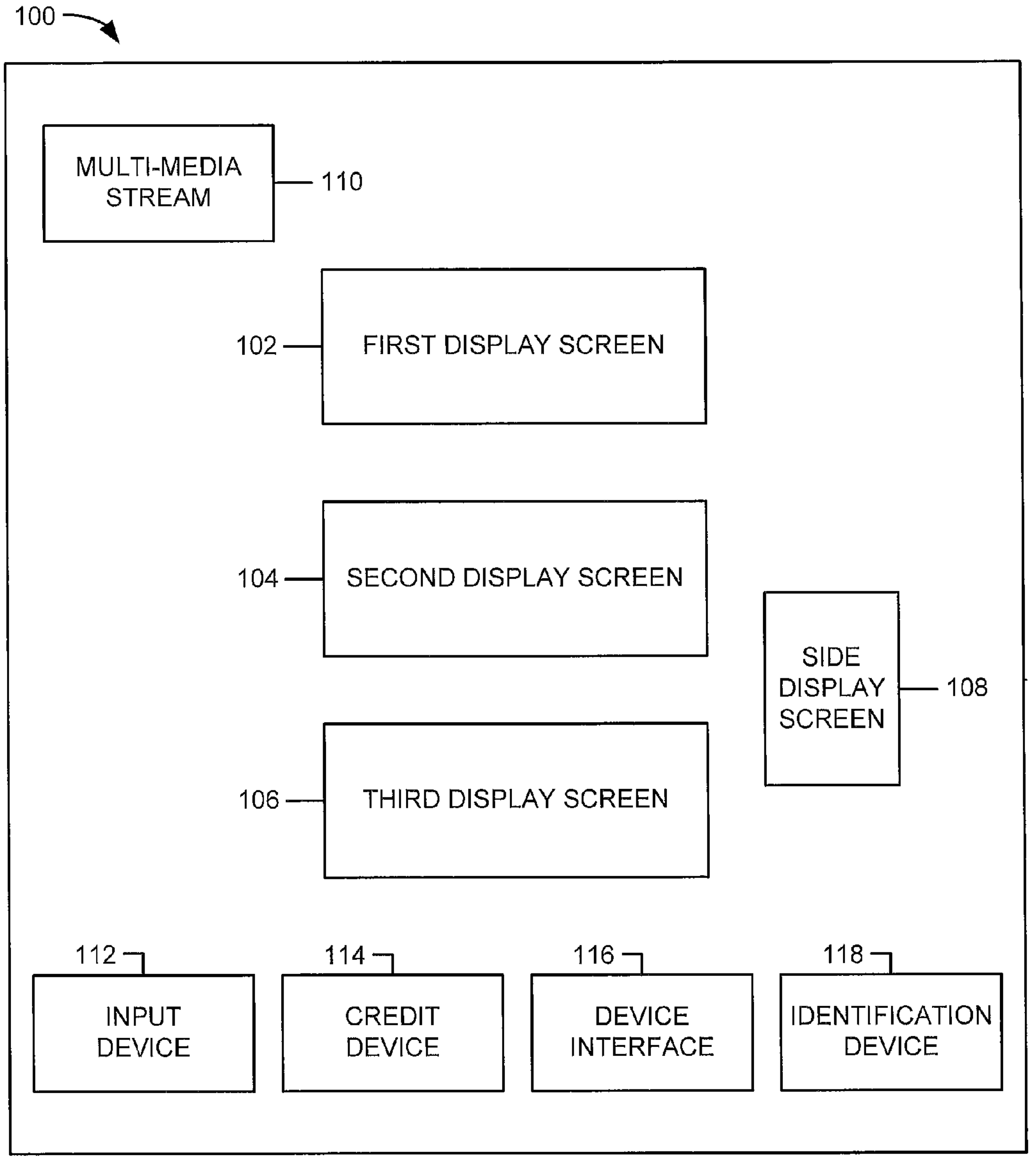
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to bank a multiplier, to utilize a banked multiplier, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), or any combination thereof. These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, and/or any combination thereof.

Device interface 116 may be utilized to connect a player to electronic gaming device 100 through a mobile device, card, keypad, identification device 118, or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, a banking multiplier option may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have multiplier banking gaming options only. Therefore, no non-multiplier banking gaming options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, or any combination thereof. Second display screen 104, third display screen 106, side display screen 108, and any other screens may utilize the same technology as first display screen 102 and/or any combination of technologies. First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media 110, and the media may be displayed on first display screen 102.

Figure 2:
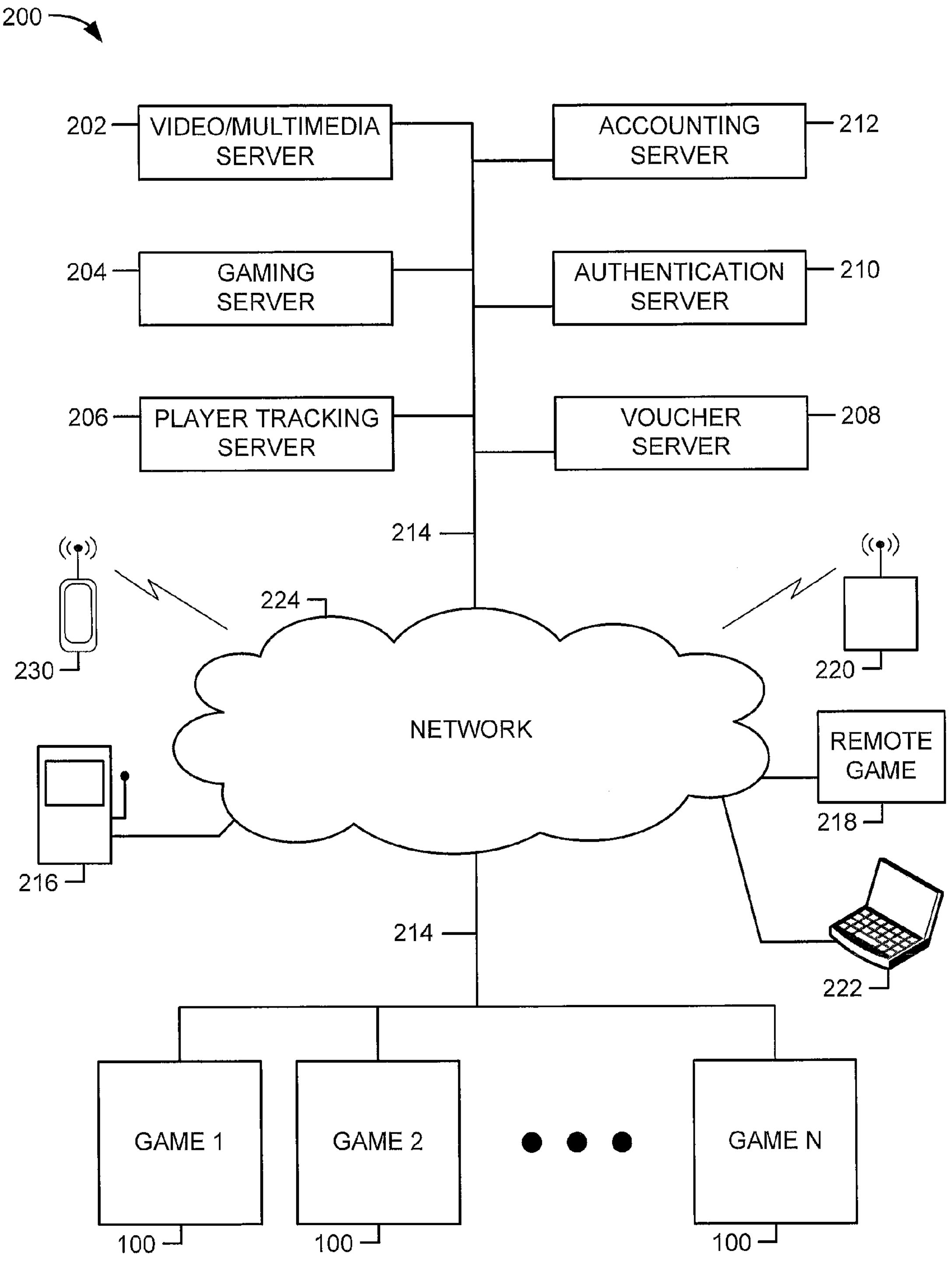
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/Multi-media server 202 may transmit these video streams via network link 214 and/or network 224.

For example, a remote gaming device at the same location may be a casino with multiple casino floors, a casino that allows wagering activities to take place from the hotel room, a casino that may allow wagering activities to take place from the pool area, etc. In another example, the remote devices may be at another location, such a progressive link to another casino, or a casino corporation that owns many different casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include banked multipliers, columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for player's tracked outcomes.

Network connection 214 may be used for communication between dedicated servers, thin clients, thick clients, back-office accounting systems, etc.

Laptop computer 222 and/or any other electronic device (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components such as, network interface cards, repeaters and hubs, bridges, switches, routers, firewalls, or any combination thereof may also be part of network 224.

Figure 3:
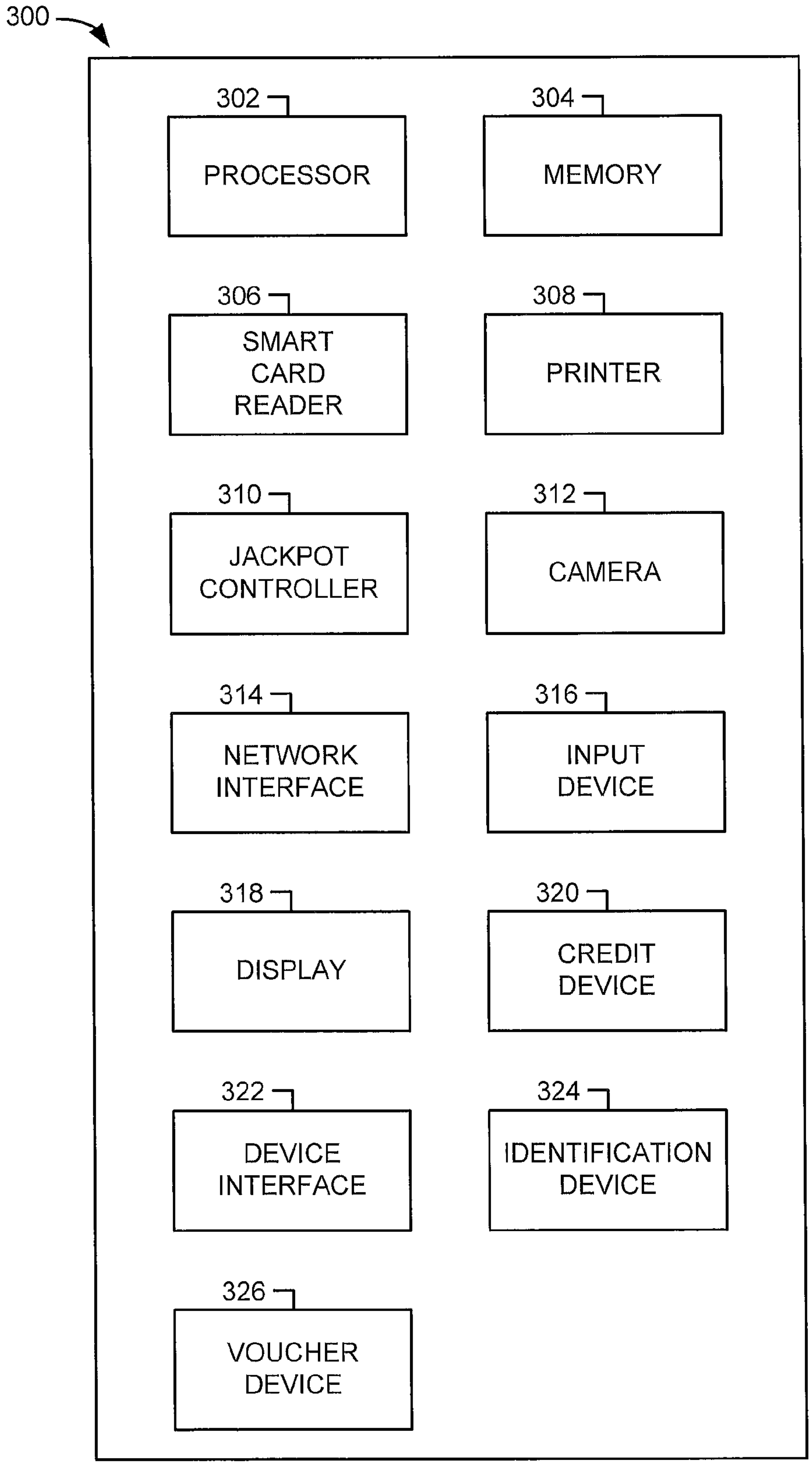
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308 and/or video or pictures captured by camera 312 may be saved and stored on memory 304. Memory 304 may include a confirmation module, which may authenticate a value of a voucher and/or the validity of the voucher. The processor may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory such as, read-only memory ("ROM"), erasable programmable read-only memory ("EPROM"), electrically erasable programmable read-only memory ("EEPROM"), flash memory ("NVRAM"), or Nano-RAM (carbon nanotube random access memory), and/or any combination thereof.

Memory 304 may also be volatile semiconductor memory such as, dynamic random access memory ("DRAM") or static random access memory ("SRAM"), and/or any combination thereof.

Memory 304 may also be a data storage device such as, a hard disk drive, an optical disk drive such as, CD, DVD, or Blu-ray, a solid state drive, a memory stick, a CompactFlash card, a USB flash drive, a Multi-media Card, an xD-Picture Card, or any combination thereof.

Memory 304 may be used to store read-only program instructions for execution by processor 302, for the read-write storage for global variables and static variables, read-write storage for uninitialized data, read-write storage for dynamically allocated memory, and for the read-write storage of the data structure known as "the stack," and/or any combination thereof.

Memory 304 may be used to store the read-only pay table information for which symbol combinations on a given payline that result in a win (payout) are established for games of chance such as, slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100 such as, door open, coin jam, ticket print failure, ticket (paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (i.e., a wagering instrument with a fixed waging value that can only be used for non-cashable credits), drink tokens, comps, or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Video obtained by camera 312 may then be used as part of game play, or may be used for security purposes. For example, a camera located on electronic gaming device 100 may capture video of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or alternate display screen as set in the player's options.

A voucher device 326 may generate, print, transmit, or receive a voucher. The voucher may represent a wagering option, a wagering structure, a wagering timeline, a value of wager, a payout potential, a payout, or any other wagering data. A voucher may represent an award, which may be used for other locations inside of the gaming establishment. For example, the voucher may be a coupon for the local buffet or a concert ticket.

Figure 4:
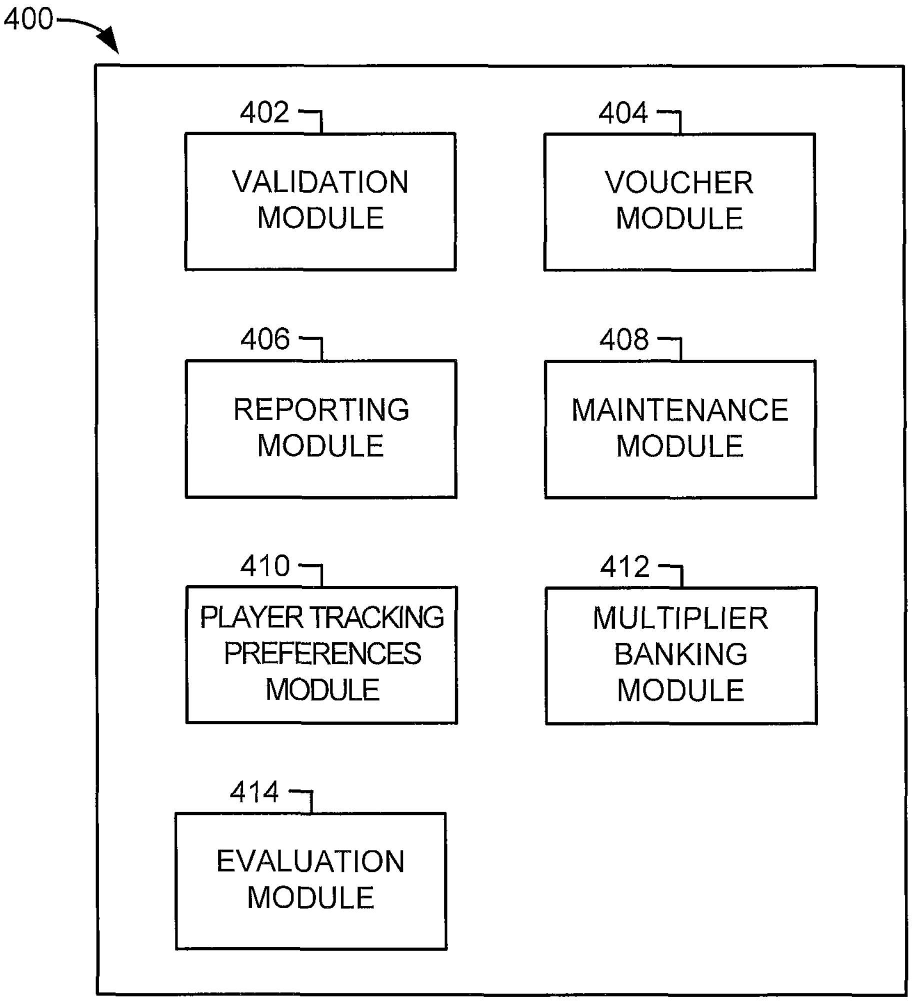
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a multiplier banking module 412, and an evaluation module 414.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Multiplier banking module 412 may include one or more multiplier banking structures. These multiplier banking structures may vary the payout of the randomly generated payout based on which multiplier banking structure was utilized during game play. For example, when a player utilizes a banked multiplier, such as a three times multiplier the randomly generated prize may be increased by three times. In another example, when the player utilizes the banked multiplier (e.g., 3×) the randomly generated prize may be increased by 2× but the display may show the base prize being increased by 3×. For example, the randomly generated prize may have been 150 credits, which is increased two times to 300 credits. However, the display shows the randomly generated prize as 100 credits, which is increased three times to 300 credits.

Evaluation module 414 may determine payouts related to game results when there are no banked multipliers utilized.

It should be noted that multiplier banking module 412 and evaluation module 414 may be combined into one module. Further, there may be one evaluation module where the determined payout does not depend on whether there were any wild symbols, scatter symbols, and/or any other specific symbols. Further, any module, device, and/or logic function in electronic gamine device 100 may be present in electronic gaming system 200. In addition, any module, device, and/or logic function in electronic gaming system 200 may be present in electronic gaming device 100.

Figure 5A:
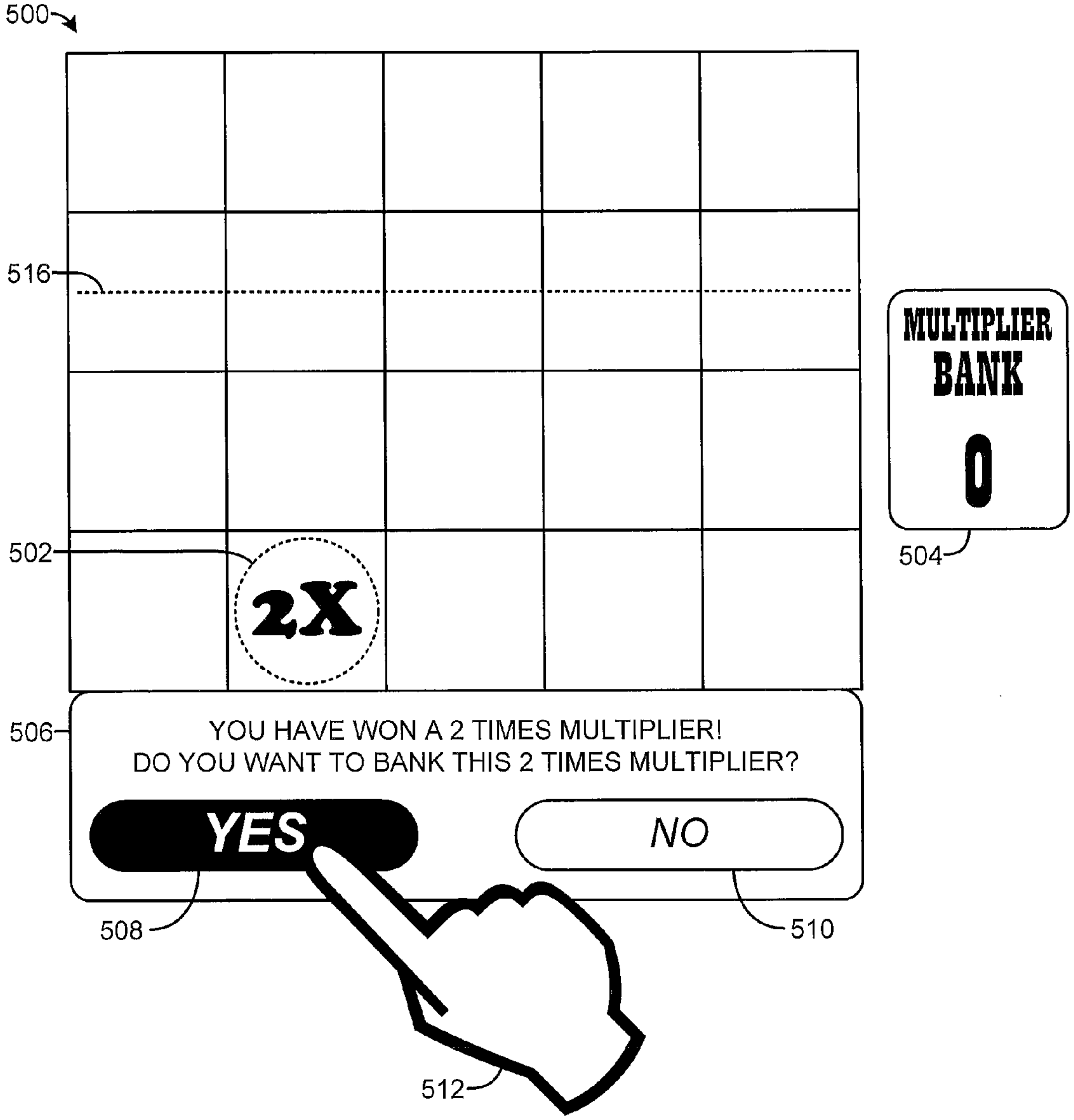
FIG. 5A is an illustration of utilizing a multiplier banking option on an electronic gaming device, according to one embodiment.

FIG. 5A is an illustration of utilizing a multiplier banking option on electronic gaming device 100, according to one embodiment. A gaming image 500 may include a first multiplier 502, a multiplier bank image 504, an input screen 506, a first input option 508, a second input option 510, an input selection image 512, and a first payline 516. In one example, the game play may result in first payline 516 being a winning payline and first multiplier 502 being generated. First multiplier 502 may increase the winning payout for first payline 516 by 2×. Therefore, if the winning payout was 100 credits, first multiplier 502 would increase this payout to 200 credits. In one example, electronic gaming device 100 and/or electronic gaming system 200 may transmit a request asking the player if the player wants to bank first multiplier 502. This request may be located at input screen 506. If the player wants to bank the multiplier, the player via input selection image 512 (or any other method) selects first input option 508. If the player selects first input option 508, the payout of 100 credits may not be increased to 200 credits. If the player does not want to bank the multiplier, the player via input selection image 512 (or any other method) selects second input option 510. If the player selects second input option 510, the payout of 100 credits may be increased to 200 credits. If the player banks the 2× multiplier, then multiplier bank image 504 may be modified to show a 2× (see FIG. 5B).

Figure 5B:
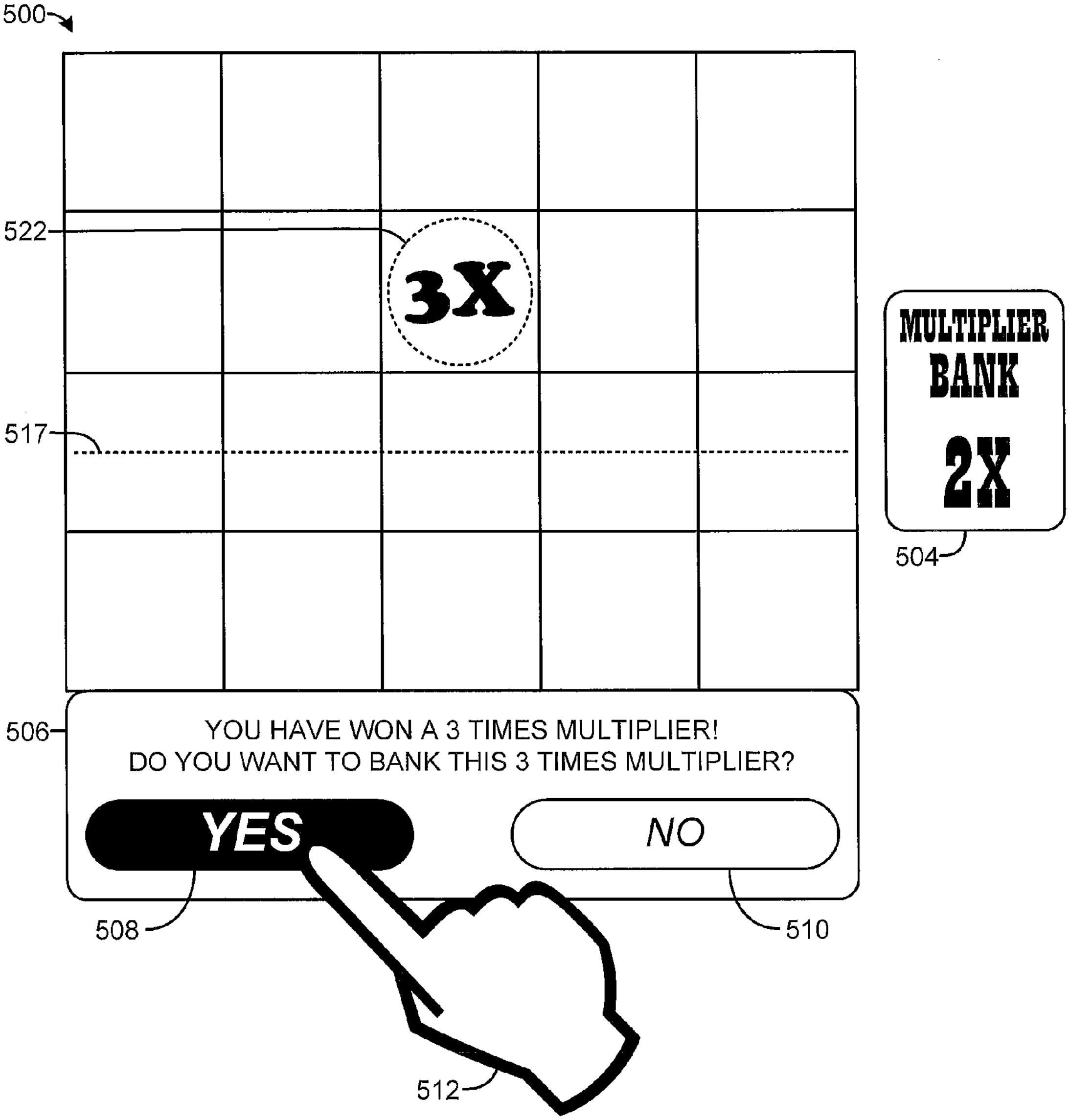
FIG. 5B is another illustration of utilizing a multiplier banking option on an electronic gaming device, according to one embodiment.

In FIG. 5B, another illustration of utilizing a multiplier banking option on electronic gaming device 100 is shown, according to one embodiment. Gaming image may include a second multiplier 522, multiplier bank image 504, input screen 506, first input option 508, second input option 510, input selection image 512, and a second payline 517. In one example, the game play may result in second payline 517 being a winning payline and second multiplier 522 being generated. Second multiplier 522 may increase the winning payout for second payline 517 by 3×. Therefore, if the winning payout was 100 credits, second multiplier 522 would increase this payout to 300 credits. In one example, electronic gaming device 100 and/or electronic gaming system 200 may transmit a request asking the player if the player wants to bank second multiplier 522. This request may be located at input screen 506. If the player wants to bank the multiplier, the player via input selection image 512 (or any other method) selects first input option 508. If the player selects first input option 508, the payout of 100 credits may not be increased to 300 credits. If the player does not want to bank the multiplier, the player via input selection image 512 (or any other method) selects second input option 510. If the player selects second input option 510, the payout of 100 credits may be increased to 300 credits. If the player banks the 3× multiplier, multiplier bank image 504 may be modified to show a 5× (see FIG. 5C).

In another example, a portion of the multiplier may be banked. In one example, the game play may result in second payline 517 being a winning payline and second multiplier 522 being generated. Second multiplier 522 may increase the winning payout for second payline 517 by 3×. Therefore, if the winning payout was 100 credits, second multiplier 522 would increase this payout 1 to 300 credits. In one example, electronic gaming device 100 and/or electronic gaming system 200 may transmit a request asking the player if the player wants to bank second multiplier 522. This request may allow a portion (e.g., 1× or 2×) of second multiplier 522 to be banked. In one example, the player may decide to bank the 1× multiplier. In this example, the winning payout of 100 credits may be increased by the non-banked multiplier (e.g., 2×) to generate a payout of 200 credits (e.g., 100 credits times 2).

Figure 5C:
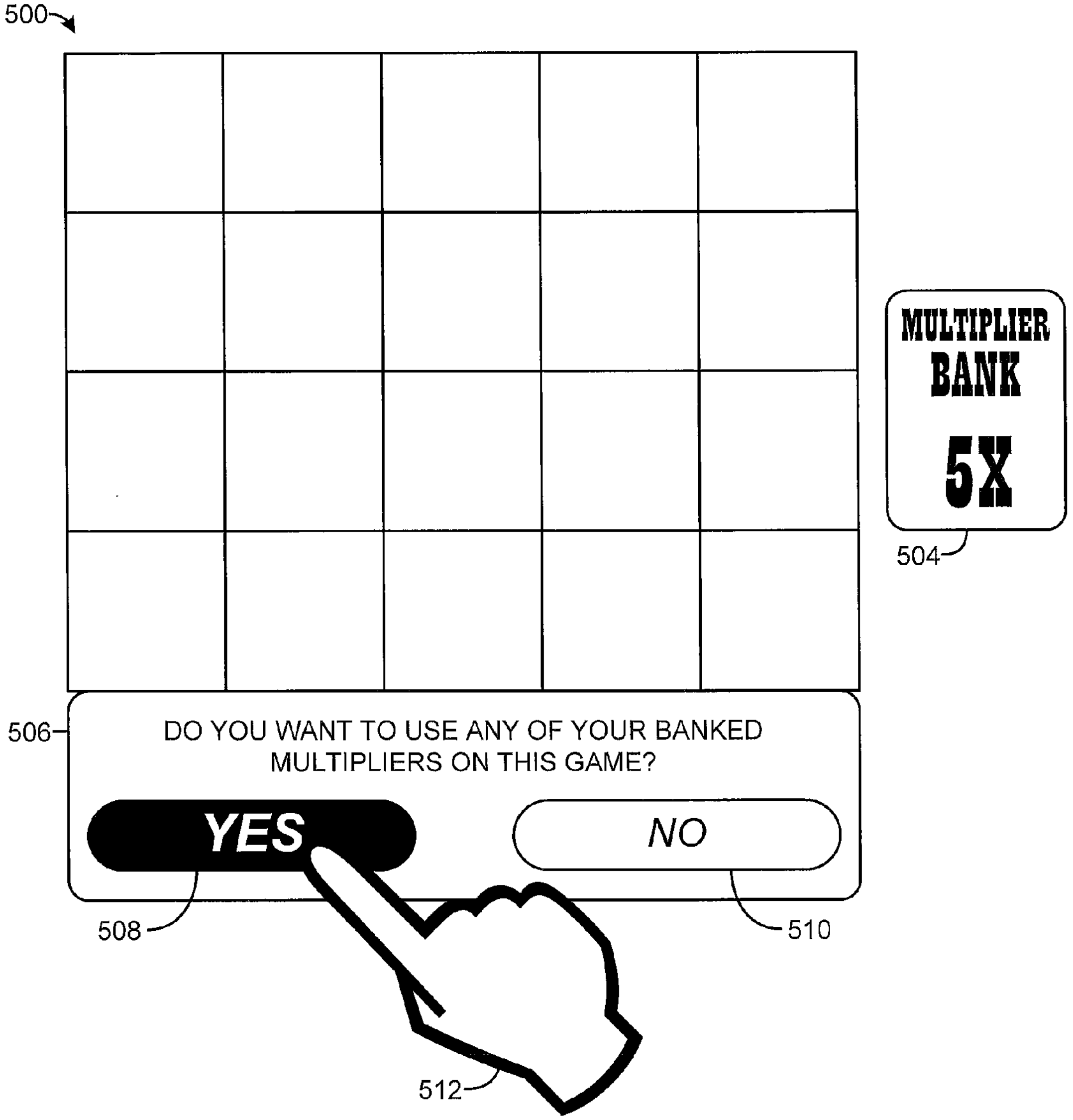
FIG. 5C is another illustration of utilizing a multiplier banking option on an electronic gaming device, according to one embodiment.

FIG. 5C is an illustration of utilizing a multiplier banking option on electronic gaming device 100, according to one embodiment. Gaming image 500 may include input screen 506, first input option 508, second input option 510, and input selection image 512. In various examples, the player may utilize any portion of the 5× multiplier represented in multiplier bank image 504. For example, a player may utilize 2× of the 5×, which would leave a 3× multiplier for future play. In this example, the player would select the utilization of the 2× multiplier, which would increase any payout award by two times. The selection process may occur before the game has started, while the game results are being generated, and/or after the game results are generated. The player may make a banked multiplier selection via input screen 506 utilizing first input option 508, second input option 510, another input button, another input device, and/or any other input method (e.g., touch screen, voice commands, knobs, etc.).

In one example, the game play may generate a payout of 200 credits, which would be increased to 400 credits because of the player's selection to utilize the 2× banked multiplier.

In another example, a player may utilize 3× of the 5×, which would leave a 2× multiplier for future play. In this example, the player would select the utilization of the 3× multiplier, which would increase any payout award by three times. In one example, the game play may generate a payout of 300 credits, which would be increased to 900 credits because of the player's selection to utilize the 3× banked multiplier.

In another example, a player may utilize 4× of the 5×, which would leave a 1× multiplier for future play. In this example, the player would select the utilization of the 4× multiplier, which would increase any payout award by four times. In one example, the game play may generate a payout of 300 credits, which would be increased to 1200 credits because of the player's selection to utilize the 4× banked multiplier.

In another example, the player may select to utilize a banked multiplier and the game results may generate another multiplier. For example, the player may have selected to utilize a 2× banked multiplier and the game results generated a separate 3× multiplier. In this example, the player may utilize the 2× banked multiplier and the 3× multiplier together to generate a super multiplier. The super multiplier may be 5× (e.g., 2×+3×) and/or 6× (e.g., 2× times 3×). In these examples, a payout of 100 credits may be increased to 500 credits and/or 600 credits, respectfully.

In another example, the player may be allowed to utilize any portion of the super multiplier and bank the remainder. For example, if a player has a super multiplier of 6×, the player may select to utilize a 4× multiplier and bank a 2× multiplier. In various examples, the 6× multiplier may be separated into any combination (e.g., 1× banked, 5× used; 2× banked, 4× used; 3× banked, 3× used; 4× banked, 2× used; and 5× banked, 1× used).

Figure 5D:
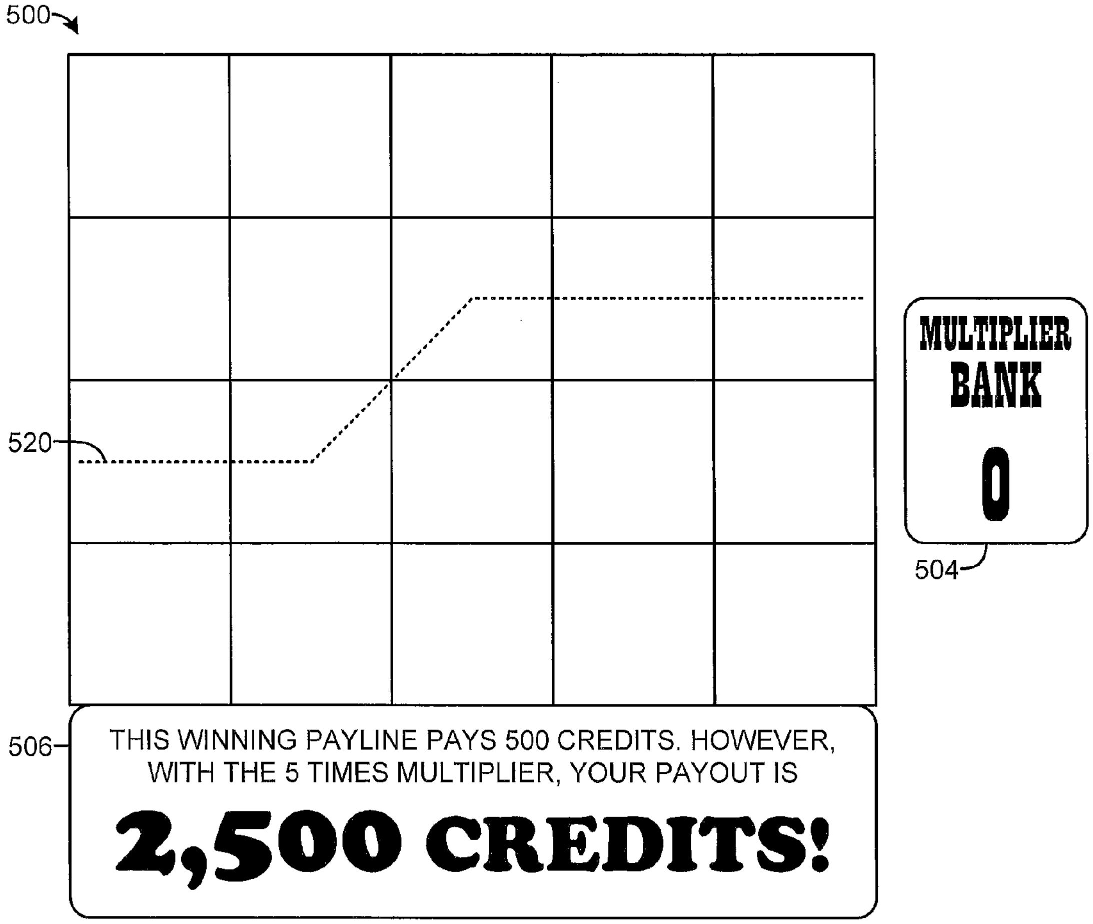
FIG. 5D is another illustration of utilizing a multiplier banking option on an electronic gaming device, according to one embodiment.

In FIG. 5D, another illustration of utilizing a multiplier banking option on electronic gaming device 100 is shown, according to one embodiment. Gaming image 500 may include multiplier bank image 504, input screen 506, first input option 508, second input option 510, input selection image 512, and a third payline 520. Before the game play started, the player may have selected to utilize his or her entire 5× multiplier. The game play resulted in third payline 520, which had a payout of 500 credits. The 500 credits were multiplied by five to increase the payout to 2,500 credits, which is displayed via input screen 506.

Figure 5E:
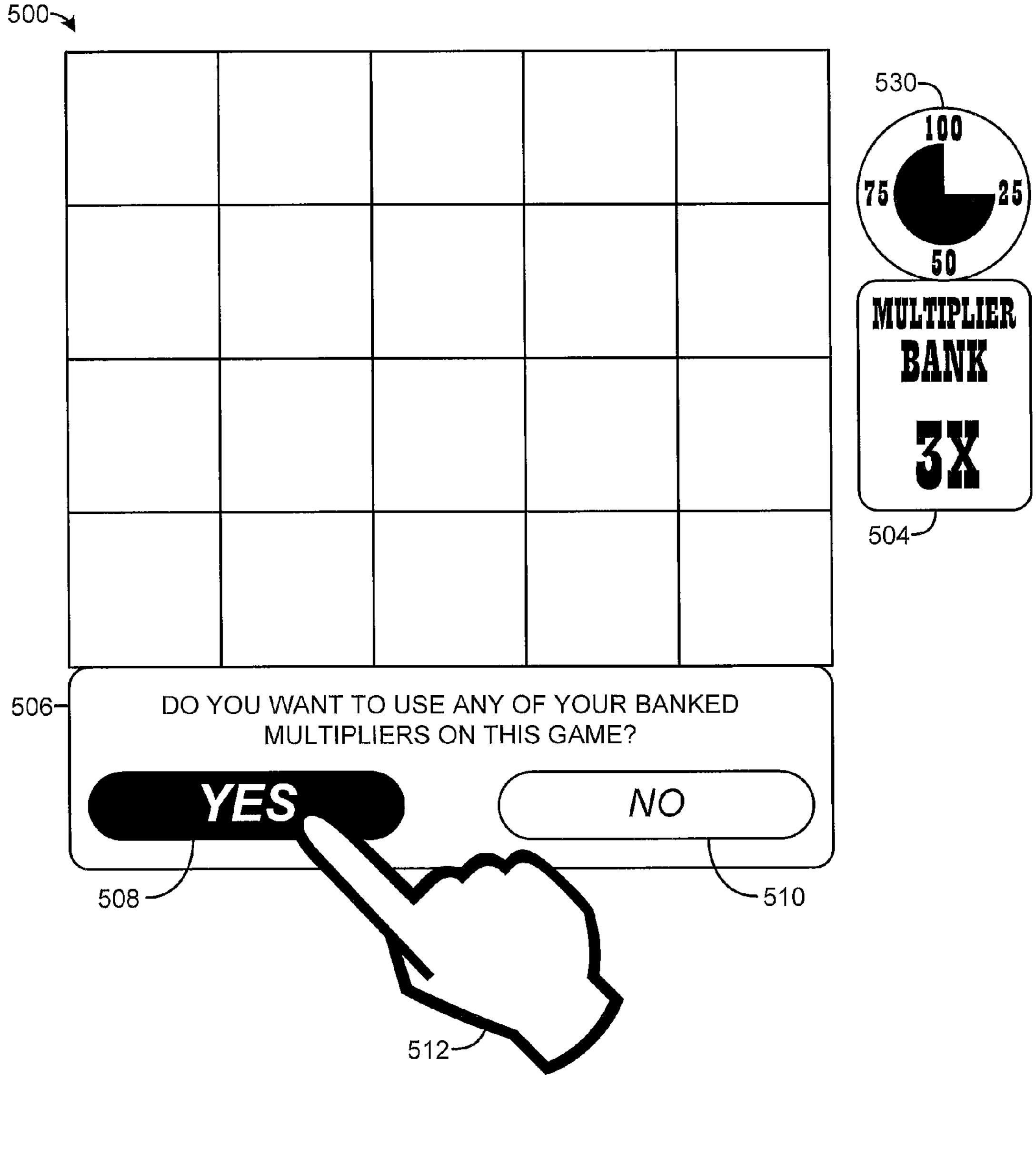
FIG. 5E is another illustration of utilizing a multiplier banking option on an electronic gaming device, according to one embodiment.

In FIG. 5E, another illustration of utilizing a multiplier banking option on electronic gaming device 100 is shown, according to one embodiment. Gaming image 500 may include multiplier bank image 504, input screen 506, first input option 508, second input option 510, input selection image 512, and a time image 530. In this example, the banked multiplier in multiplier bank image 504 may have a time limit for utilizing the banked multiplier. The time limit may be represented by time image 530. In this example, the player may have to utilize the banked multipliers before the time limit is over, which may increase the excitement of the game play. In one example, a multiplier may be increased based on utilizing a time limit version game. In another example, a multiplier may be increased based on the time limit reaching some predetermined point. For example, when the time limit has reached a 10-second countdown, the multiplier may be increased (e.g., 5× to 7×). The multiplier may be increased in any increment (e.g., 1, 2, 3, 4, 2×, 3×, etc.).

This banking multiplier feature may be part of the base game and/or a bonus game. In addition, this banking multiplier feature may be part of a base bet and/or may require an additional side bet (e.g., ante bet).

Figure 6:
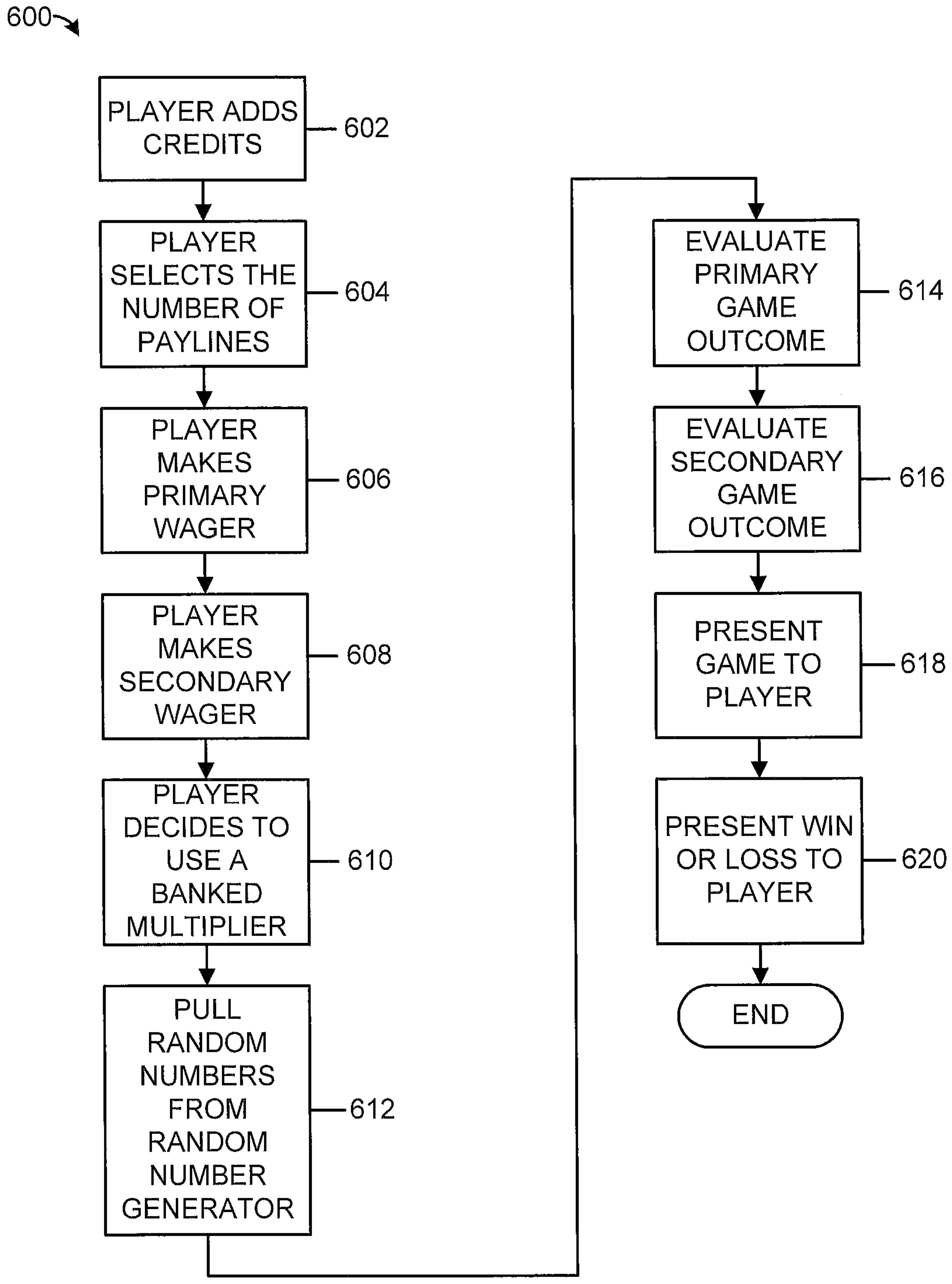
FIG. 6 is a flow diagram for accepting a primary wager on an electronic gaming device, according to one embodiment.

In FIG. 6, a wagering flow diagram 600 is shown. The method may include the starting of the game. The method may include the player adding credits to electronic gaming device 100 (step 602). The method may include the player selecting the number of paylines to utilize (step 604). The method may include the player making a primary wager on one or more paylines (step 606). The method may further include the player making a secondary wager to enable a banking multiplier option (step 608). The method may include receiving input relating to utilizing a banked multiplier (step 610). The method may include electronic gaming device 100 pulling random numbers from the random number generator (step 612). The method may include the evaluation of the game outcome for the primary wager (step 614). The method may further include the evaluation of the game outcome for the secondary wager (step 616). The method may include presenting the game play to the player (step 618). The method may include presenting the game outcome (win or loss) to the player (step 620). The method may then end.

Figure 7:
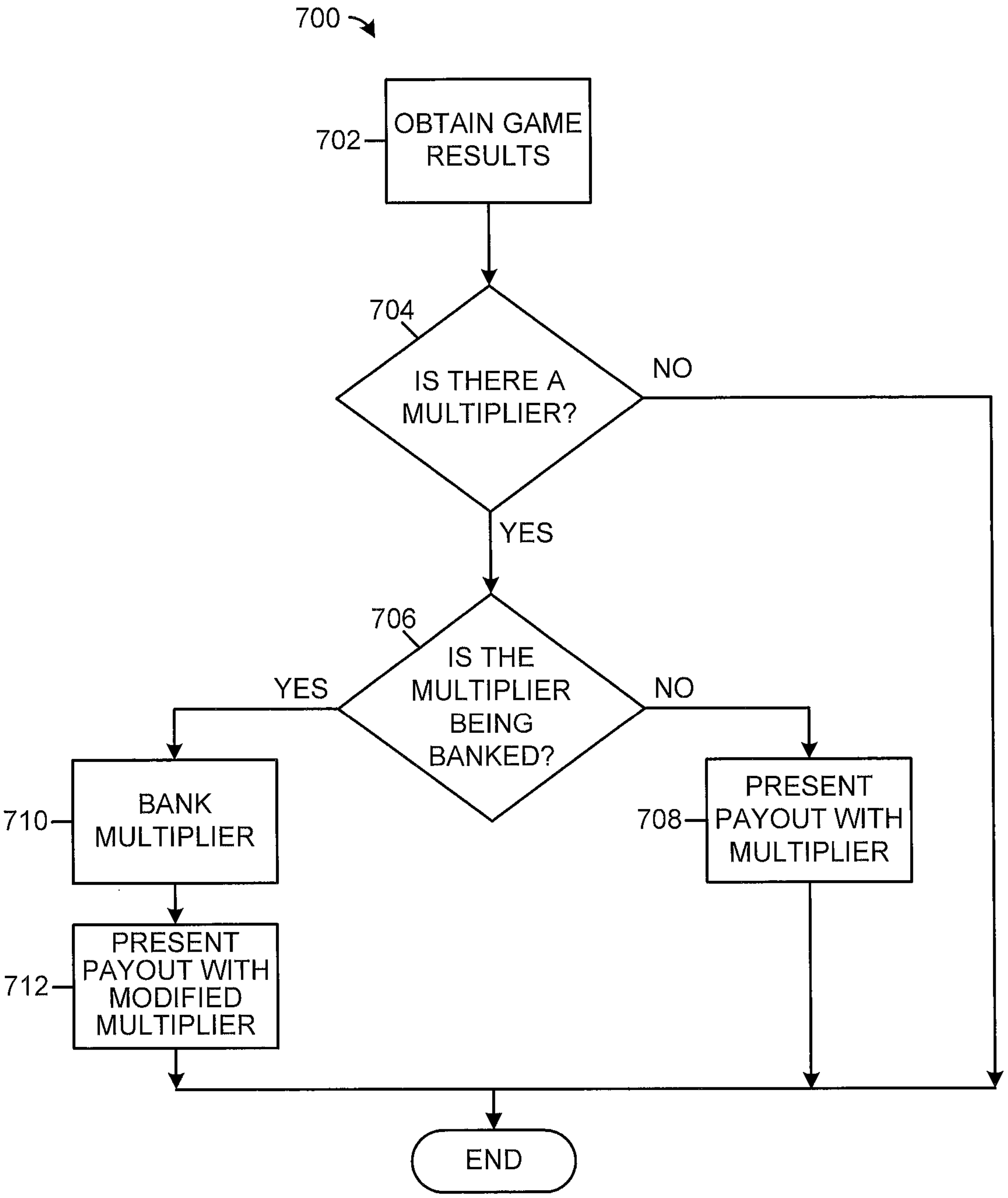
FIG. 7 is a flow diagram for banking multipliers, according to one embodiment.

In FIG. 7, a flow diagram for banking multipliers 700 is shown. The method may include the starting of the game. The method may include electronic gaming device 100 and/or electronic gaming system 200 obtaining the game results (step 702). The method may include electronic gaming device 100 and/or electronic gaming system 200 determining if there is a multiplier relating to the game results (step 704). If there is no multiplier, the method may end. If there is a multiplier, electronic gaming device 100 and/or electronic gaming system 200 may determine if an input has been received to bank the multiplier (step 706). If the multiplier is not being banked, the method may include presenting the payout based on the multiplier (step 710) and then the method may end. If the multiplier is being banked, the method may bank the multiplier (step 710). Further, the method may present the payout based on the modified multiplier (step 712) and the method may end.

The player may bank the entire multiplier or any portion thereof. For example, the game results may generate a multiplier of 5×. The player may bank the entire 5× multiplier or any portion thereof (e.g., 1×, 2×, 3×, and/or 4×). In another example, during steps 710-712, the player may decide to bank 3× out of his or her 5× multiplier. In this example, the 3× multiplier may be bank and the payout generated in step 712 would be based on the remaining 2× multiplier (e.g., 5× minus 3× equals 2×). In another example, if the player decided not to bank any of the 5× multiplier, the payout generated at step 708 would be based on the entire 5× multiplier.

Figure 8:
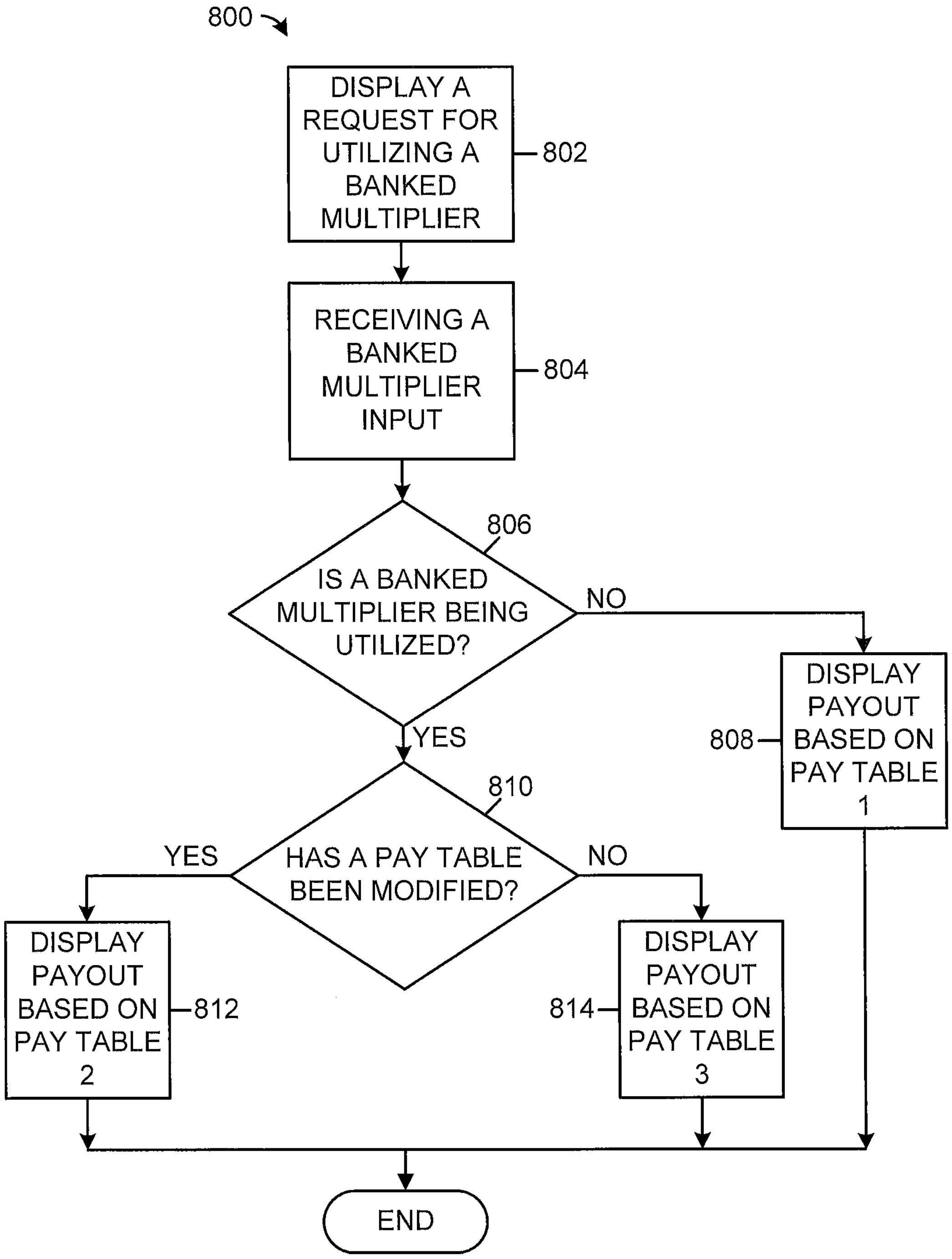
FIG. 8 is a flow diagram for banked multipliers game play, according to one embodiment.

In FIG. 8, a flow diagram for utilizing banked multipliers 800 is shown, according to one embodiment. The method may include displaying a request to utilize a banked multiplier (step 802). The method may include receiving a banked multiplier input (step 804). The method may include electronic gaming device 100 and/or electronic gaming system 200 determining if a banked multiplier was utilized (step 806). If no banked multiplier was utilized, the method may include displaying a payout based on a first paytable (step 808). If a banked multiplier was utilized, the method may include electronic gaming device 100 and/or electronic gaming system 200 determining if a paytable has been modified (step 810). If the paytable has been modified, then the method may include displaying the payout based on a second paytable (step 812). If the paytable has not been modified, then the method may include displaying the payout based on a third paytable (step 814).

For example, when a player utilizes a banked multiplier, such as a three times multiplier the randomly generated prize may be increased by three times utilizing the third paytable. In another example, when the player utilizes the banked multiplier (e.g., 3×) the randomly generated prize may be increased by 2× utilizing the second paytable, but the display may show the base prize being increased by 3×. For example, the randomly generated prize may have been 150 credits, which is increased two times to 300 credits. However, the display shows the randomly generated prize as 100 credits, which is increased three times to 300 credits.

In an exemplary embodiment, the electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more multiplier banking options.

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on one or more multiplier banking options.

The plurality of reels may form a 5-by-5 matrix, a 3-by-5 matrix, a 4-by-5 matrix, a 4-by-3 matrix, a 5-by-3 matrix, or any number-by-any number matrix.

In one embodiment, the electronic gaming device may include a plurality of reels. The plurality of reels may include a plurality of symbols. The electronic gaming device may include one or more paylines formed on at least a portion of the plurality of reels. The electronic gaming device may include a memory. The memory may include a multiplier banking module. The multiplier banking module may include a plurality of multiplier banking structures. The electronic gaming device may include a processor, which may bank a multiplier based on a received input.

In another example, the processor may transmit a signal related to utilizing a banked multiplier. In another example, the processor may display a banked multiplier option via a display. Further, the processor may receive an input relating to utilizing the banked multiplier. In addition, the processor may generate game results. In another example, the processor may modify the game results based on a utilized banked multiplier. In addition, the processor may display a modified game result via the display.

In one embodiment, the method may include receiving one or more primary wagers on one or more paylines. The method may include determining a first primary wager payout. The method may include determining one or more multipliers. The method may include banking at least a portion of the one or more multipliers.

In another example, the method may include transmitting a signal related to utilizing a banked multiplier. In addition, the method may include displaying a banked multiplier option. Further, the method may include receiving an input relating to utilizing the banked multiplier. The method may include determining a second primary wager payout. The method may include modifying the second primary wager payout based on a utilized banked multiplier. In addition, the method may include displaying a modified payout. The method may include receiving a secondary wager to allow for a banking multiplier function.

In another embodiment, the electronic gaming system may include a server. The server may include a server memory and a server processor. The server may receive primary wagers and secondary wagers. The server processor may bank a multiplier based on a received input. The server memory may include a multiplier banking module. The multiplier banking module may include a plurality of multiplier banking structures.

In another example, the server processor may transmit a signal related to utilizing a banked multiplier. The server processor may display a banked multiplier option via a display. The server processor may receive an input relating to utilizing the banked multiplier. The server processor may generate game results and modify a generated game result based on the banked multiplier Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a plurality of reels, the plurality of reels including a plurality of symbols forming one or more paylines;

at least one input device;

a memory device, the memory device configured to store a multiplier banking module, the multiplier banking module including a plurality of multiplier banking structures; and a processor configured to:

generate a winning outcome using the plurality of reels for a first game play occurrence, the first game play occurrence including a non-multiplier award and a multiplier award;

receive a first input from a player, via the at least one input device, to bank at least one of the multiplier award and a portion of the multiplier award;

bank, in the memory device, at least one of the multiplier award and the portion of the multiplier award based on the received first input from the player;

start an expiration time period for a banked multiplier, wherein the banked multiplier is based on the banking of the at least one of the multiplier award and the portion of the multiplier award;

display a multiplier countdown clock which displays a time remaining before an end of the expiration time period, wherein the banked multiplier is configured to become unusable at the end of the expiration time period;

receive a second input from the player, via the at least one input device, to utilize the banked multiplier; and utilize at least a portion of the banked multiplier based on the received second input from the player, wherein the received second input occurs after the first game play occurrence has ended and changes an award associated with an outcome for a second game play occurrence based on one of the plurality of multiplier banking structures.

2. The electronic gaming device of claim 1, wherein the processor is further configured to transmit a signal related to utilizing at least the portion of the banked multiplier.

3. The electronic gaming device of claim 2, wherein the processor is further configured to display a banked multiplier option via a display device.

4. The electronic gaming device of claim 1, wherein the processor is further configured to generate the outcome for the second game play occurrence.

5. The electronic gaming device of claim 4, wherein the processor is further configured to modify the outcome of the second game play occurrence based on a utilizing of at least the portion of the banked multiplier.

6. The electronic gaming device of claim 5, wherein the processor is further configured to display a modified outcome of the second game play occurrence via a display device.

7. A method of providing gaming options via an electronic gaming device including a plurality of reels having a plurality of symbols thereon forming one or more paylines, at least one input device, a memory device configured to store a multiplier banking module, the multiplier banking module including a plurality of multiplier banking structures, and a processor, the method comprising:

generating, by the processor, a winning outcome using the plurality of reels for a first game play occurrence, the first game play occurrence including a non-multiplier award and a multiplier award;

receiving a first input from a player, via the least one input device, to bank at least one of the multiplier award and a portion of the multiplier award;

banking, in the memory device, at least one of the multiplier award and the portion of the multiplier award based on the received first input from the player;

starting, by the processor, an expiration time period for a banked multiplier, wherein the banked multiplier is based on the banking of the at least one of the multiplier award and the portion of the multiplier award;

displaying, by a display device associated with the electronic gaming device, a multiplier countdown clock which displays a time remaining before an end of the expiration time period, wherein the banked multiplier is configured to become unusable at the end of the expiration time period;

receiving a second input from the player, via the at least one input device, to utilize the banked multiplier; and utilizing, by the processor, at least a portion of the banked multiplier based on the received second input from the player, wherein the received second input occurs after the first game play occurrence has ended and changes an award associated with an outcome for a second game play occurrence based on one of the plurality of multiplier banking structures.

8. The method of claim 7, further comprising transmitting a signal related to utilizing at least the portion of the banked multiplier.

9. The method of claim 8, further comprising displaying, by the display device, a banked multiplier option.

10. The method of claim 7, further comprising determining, by the processor, the outcome for the second game play occurrence.

11. The method of claim 10, further comprising modifying the outcome of the second game play occurrence based on a utilization of at least the portion of the banked multiplier.

12. The method of claim 11, further comprising displaying, by the display device, a modified payout.

13. The method of claim 7, further comprising receiving, by the processor, a secondary wager to allow for a banking multiplier function.

14. An electronic gaming system comprising:

a server including at least:

a server processor; and a server memory device configured to store a multiplier banking module, the multiplier banking module including a plurality of multiplier banking structures; and an electronic gaming device communicatively coupled to the server, the electronic gaming device including at least:

a plurality of reels, the plurality of reels including a plurality of symbols forming one or more paylines; and at least one input device;

wherein, the server processor is configured to:

receive primary wagers and secondary wagers;

generate a winning outcome using the plurality of reels for a first game play occurrence, the first game play occurrence including a non-multiplier award and a multiplier award;

receive a first input from a player, via the at least one input device, to bank at least one of the multiplier award and a portion of the multiplier award;

bank, in the server memory device, at least one of the multiplier award and the portion of the multiplier award based on the received first input from the player;

start an expiration time period for a banked multiplier, wherein the banked multiplier is based on the banking of the at least one of the multiplier award and the portion of the multiplier award;

display a multiplier countdown clock which displays a time remaining before an end of the expiration time period, wherein the banked multiplier is configured to become unusable at the end of the expiration time period;

receive a second input from the player, via the at least one input device, to utilize the banked multiplier; and utilize at least a portion of the banked multiplier based on the received second input from the player, wherein the received second input occurs after the first game play occurrence has ended and changes an award associated with an outcome for a second game play occurrence based on one of the plurality of multiplier banking structures.

15. The electronic gaming system of claim 14, wherein the server processor is further configured to transmit a signal related to utilizing at least the portion of the banked multiplier.

16. The electronic gaming system of claim 15, wherein the server processor is further configured to display a banked multiplier option via a display device.

17. The electronic gaming system of claim 14, wherein the server processor is further configured to modify a paytable based on utilizing at least the portion of the banked multiplier.

* * * * *